3,000,748
STRIPPABLE COATINGS
Walter L. Clark, Ramsey, N.J., assignor to American Cyanamid Company, New York, N.Y., a corporation of Maine
No Drawing. Filed Jan. 8, 1959, Ser. No. 785,575
13 Claims. (Cl. 106—180)

The present invention is concerned with forming protective coatings, particularly for foodstuffs, and with a novel product therefor. More particularly, it provides a novel thermoplastic composition that can be readily coated on material to be protected, forming thereon a smooth, strong, cohesive, tightly-adherent, easily-peeled, transparent protective coating.

There is a growing demand for suitable materials to be used as protective coatings on various materials, including foodstuffs. Such a coating should be smooth, non-sticky, non-tacky and non-greasy. It should be capable of being readily applied and removed without substantial effect on the material coated. It should be a uniformly strong and cohesive film, highly impermeable to transmission of air and moisture, but it should not be readily adherent to other materials and therefore readily removed by stripping. It should be substantially transparent over a wide temperature range and remain pliable at refrigeration temperatures as low as minus 20° C. It should be capable of application by ordinary methods such as dipping, enrobing, liquid film or falling curtain film and, if possible spraying.

In the past, glycerides of various origin, have been acylated with fatty acids of some two to four carbon atoms to obtain "wax-like" materials, generally referred to as "acetoglycerides." These materials, or mixtures of them, have been proposed for and used as food coatings. Compositions of this nature are frequently referred to as hot melts.

Use in such melts of various modifying agents such as oils, fat and waxes, fillers, and strengthening agents, such as cellulose esters and ethers also have been proposed. Several such compositions even have achieved considerable commercial acceptance.

However, none have been wholly satisfactory. All have been deficient in one or more of such properties as strength, permeability, color, greasiness, stability or strippability. None have been adequately transparent. Protective films of sufficient strength were usually difficult to remove from the coated object. In some cases they required melting off. Moreover, as the film strength was increased, the translucent properties disappeared and the film became opaque.

It is, therefore, the principal object of the present invention to provide a suitable coating composition which is not subject to the deficiencies of previous coatings. Further objects include providing a composition which melts at a sufficiently low temperature that it can be spray-coated or applied as a liquid film on perishable foodstuffs without damage to the latter; which will produce a film which is substantially transparent in thickness of 0.32 mm. or more; will have a minimum breaking strength at least equivalent to about 300 gm./sq. cm. at about 0.32 mm. thickness; and will have a specific permeability at about 4° C., substantially below about 2.0 mg. of $H_2O$/sq. cm./24 hours for one mm. thickness.

Surprisingly, these objects have been accomplished in the present invention to a highly successful degree. Completely transparent films of varying thicknesses are readily obtainable. A bursting strength equivalent to 300 gm./sq. cm. at about 0.32±0.07 mm. thickness is easily attained. The hot melt can be sprayed, even on meats, vegetables and other foodstuffs. The film remains in place on the coated object but can be readily stripped from meat and other foodstuffs even at refrigeration storage temperatures. Little or no residue remains on the object after stripping off the film.

In general, these objects have been accomplished by preparing a composition comprising a suitable acylated glyceride having dissolved therein the correct amount of a suitable esterified cellulose derivative. The successful fulfilment of the objects of the invention is particularly surprising in view of the fact that analogous materials have been previously used without accomplishing the desired result.

Success in the present invention is due to the observance of several factors. Of definite importance is the selection of a glyceride from among those in the correct but limited group containing a residue of a long-chain unsaturated fatty acid. Secondly, a proper selection must be made among the many available cellulose ester derivatives. Finally, they must be blended in the proper proportions.

With respect to selecting a suitable glyceride, suitable materials consist of a group which are di- or tri-substituted in the glycerol moiety and which may be represented by the general formula

(I)

wherein:

$R_1$ may be an acyl radical, usually of about 1–6 carbon atoms, of a monobasic acid, such as formic, acetic, propionic, butyric and the like, or a polybasic acid such as lactic, tartaric and the like; or in some di-substituted glycerides may be hydrogen;

$R_2$ will be hydrogen in di-substituted glycerides wherein $R_1$ is an acyl radical, but in di-substituted glycerides wherein $R_1$ is hydrogen and in tri-substituted glycerides will be an acyl radical selected from the above-noted group; and $R_3$ will be the acyl radical of a long-chain, unsaturated fatty acid of from about 10 to about 30 carbon atoms.

Within this group, di-substituted compounds in which $R_2$ is hydrogen perhaps will be most commonly encountered. Of the acyl substituents in the $R_1$ and $R_2$ position, glycerides containing the acetate radical are generally to be preferred. Resultant films are stronger than those containing the formate or a larger group. Hydroxylated acyl groups such as the lactate also tend to produce films of lesser strength than the acetate. Glycerides having an acetate group at $R_1$ and hydrogen at $R_2$ will therefore be taken as illustrative for purposes of this discussion.

In general, for a fixed amount of a selected glyceride the longer the fatty-acid chain, the stronger the resultant film. Thus, for example, in an otherwise comparable composition, the bursting strength of a film may increase as much as 50% or more as the chain length is increased from $C_{16}$ to about $C_{22}$. In general films from glycerides containing hydroxyl groups, particularly on saturated fatty acid side chains tend to be of less strength.

With these factors in mind, the following unsaturated acetoglycerides may be taken as illustrative:

| Acid | Acetoglyceride (Common Name) |
| --- | --- |
| 9-Tetradecenoic $C_{14}H_{26}O_2$ | Acetomyristolein |
| 9-Hexadecenoic $C_{16}H_{30}O_2$ | Acetopalmitolein |
| 9-Octadecenoic $C_{18}H_{34}O_2$ | Acetoolein |
| 11-Octadecenoic 12-Octadecenoic | |
| 9-Eicosenoic $C_{20}H_{38}O_2$ | Acetogadolein |
| 11-Eicosenoic | |
| 11-Docosenoic $C_{22}H_{42}O_2$ | Acetocetolenin |
| 13-Docosenoic $C_{22}H_{42}O_2$ | Acetoerucicin |
| 15-Tetracosenoic $C_{24}H_{46}O_2$ | Acetoselacholein |
| 17-Hexacosenoic $C_{26}H_{50}O_2$ | Acetoximenin |
| 21-Triacontenoic $C_{30}H_{58}O_2$ | Acetolumequein |

While the foregoing discussion has been primarily concerned with mono-glycerides, this has been done for purposes of simplification. It is understood that the poly-glycerides combining two or more such structures will be encountered in commercially available materials and may be used.

These illustrative acetoglycerides are all single compounds having one unsaturated double bond. However the invention is not necessarily limited thereto. Many commercially-available glycerides comprise mixtures in which several unsaturated acids of varying chain length are represented. It is an advantage of the present invention that it is not limited to the use of highly-purified acetoglycerides containing only one long-chain acid. Mixtures recovered from various natural fats and oils, may be used. Nor is it essential that the glyceride be completely acylated. Commercially-available mixtures of acylated materials containing some unacylated monoglycerides may be used.

As noted above in connection with Formula I, $R_3$ represents the acyl radical of long-chain, unsaturated fatty acid of some 10 to 30 carbon atoms. However, it was also noted that of these acetoglycerides, those of greater molecular weight produce stronger films. Therefore, it is generally preferable to use materials derived from acids having a chain-length of $C_{14}$ or more, even when using a substantially purified compound. When using commercially-available mixtures, the same is true. An "average" chain length of $C_{14}$ or higher is preferred. Since such mixtures usually contain some materials having shorter chains, $R_3$ is defined above to include derivatives of $C_{10}$ acids, although such short chain materials seldom will be used alone.

Unsaturation is necessary to obtain the desired degree of transparency. Moreover, the degree of unsaturation is important. Highly purified materials containing substantially only one acyl radical wherein the acyl radical contains only one double bond are preferred. However, commercially-available mixtures may include materials derived from acids containing more than one double bond or even some acyl radicals having none. If the degree of unsaturation is too low, the film will be too opaque. If it is too high, the films are too soft or too sticky. Such a mixture should have an "average" double bond content of at least 0.5 double bonds and preferably more. It also should not "average" more than about 1.5 double bonds. This "average" should be composed of as low a content as practicable of acids containing two double bonds. Acids containing three or more double bonds are unsatisfactory.

As to the choice of a cellulose ester, those which are ordinarily to be preferred are of the cellulose acetate-butyrate type. These are commercially available in widely differing degrees of substitution. On a weight percent basis, the following constituent ranges

| | |
| --- | --- |
| Acetyl | 6-32 |
| Butyryl | 15-50 |
| Hydroxyl | 0.5-2.5 | have been found useful in the present invention. However, within this range, the more desirable materials usually will be found in a smaller group containing some 10-25% acetyl; 25-45% butyryl and about 1.0-2.2% hydroxyl. Although the acetate-butyrate groups are preferred, the butyrate group may be replaced by others such as the propionates, isobutyrates, amylates and the like. In general, it is preferred that this group contain about three to six carbon atoms. However, useful coatings may be made wherein this group is as large as sixteen to eighteen carbons, cellulose acetate-stearate for example. The invention is not limited to the use of a single ester and mixtures are equally useful if the average contents fall within the indicated limits.

In selecting a cellulose ester, not only is the degree of substitution important, but also the extent of polymerization. Commercially, this is usually indicated by a viscosity measurement. The ASTM Method (D-871-48) in which viscosity is measured by the time in seconds required for a specified ball to fall through a fixed distance at 25° C., in a 20% solution of the polymer in acetone is widely used for this purpose.

Using this standard, polymers having viscosities of from as little as about 0.25 to about 35 seconds may be used. For the preferred materials discussed above as having some 10-20% acetyl content, viscosity readings in the range of about 15 to 30 seconds generally are preferred.

Within the indicated range of degree of polymerization as measured by the viscosity range, the most noticeable effect of using a polymer of different viscosity is in the amount required for optimum results. In general, a low viscosity polymer must be used in larger amounts than a high viscosity polymer to achieve an acceptable, strippable coating of similar properties and burst strength.

For example, a composition containing about 70% of a substituted glyceride, and 30% of a cellulose derivative of some one to five seconds viscosity may be made up. The resultant film may have a burst strength of some 800 g./sq. cm. If, however, a cellulose derivative of the same general content, but a 20-30 second viscosity is used, a film of equal strength may be obtained when the polymer comprises only 15-20% of the composition.

It is preferred that at least 15% of the composition by weight should be in the form of the cellulose polymer. Above about 50% polymer in the composition tends to make the resultant film become stiff; and at about 60%, it will be very hard. In general, therefore, the range, which will include the most useful compositions will be from about 15 to about 50 weight percent of the composition and the preferred range will be from about 20 to about 40%.

Preparation of the compositions of the present invention is easily accomplished. The suitable acylated glycerides may be liquid or solid at ordinary temperatures, melting in the general range of from about minus 5° to about 70° C. They are simply liquified and the cellulose derivative is dissolved therein. These compositions should not be confused with some types of moldable compositions made in the past by absorbing certain liquid glycerides in cellulose derivatves as plasticizers for the latter. Useful films with the above-discussed properties are not obtained from such compositions.

Application of the compositions of the present invention is not limited to any particular method. The object to be protected may be covered by such known methods, for example, dipping, by enrobing or by employing a falling or a projected film. It is a particular advantage of the instant compositions that because of their particular physical properties, they are easily applied by hot-spraying.

The invention will be illustrated in conjunction with the following examples which are intended as illustrative. Unless otherwise noted, all parts are by weight, as are the ratios and percentages. Temperature measurements are in degrees centigrade.

EXAMPLE 1

To illustrate the clarity of the products of the present invention, a sample of 2,3-diacetyl-monooleate according to Formula I above wherein $R_1$ and $R_2$ represent the acetate and $R_3$ the oleate radicals is used. Acetylation is about 90% complete. A cellulose acetate-butyrate sample having an acetyl:butyryl ratio of about 13:37 and about a 20 second viscosity is used. About 85 parts of the glyceride is melted and about 15 parts of cellulose derivative is dissolved therein. A film of 0.375 mm. thickness is cast on a sheet of wire-reinforced laminated plate glass. Using a "Photovolt Optical Densitometer" without a filter, at Range Point 2, to measure the light transmission an average of four readings showed no difference between the coated and uncoated portions of the glass.

EXAMPLE 2

For purposes of comparison, Example 1 is repeated, substituting for the 2,3-diacetyl-monooleate, a sample of a commercial acylated glyceride from saturated fatty acids. In Formula I above, $R_1$ is acetate, $R_2$ is H and $R_3$ is a mixture of stearate and palmitate. Varying amounts of cellulose derivative of from one to about ten percent of the composition are dissolved in the glyceride. Compositions of 1–3% remain fairly clear, but will not form useful films of sufficient strength. At about 4% a better film is obtained but it is translucent and has a burst strength of only about 195 gm./sq. cm. At about 8%, the film is fairly strong but much less translucent. At about 10% a film of the desired 300 gm./sq. cm. strength is obtained but the film is opaque. An 0.375 mm. film of the 10% composition on wire glass is measured for light transmission as in Example 1. An average of four readings shows only 12.5% transmission for the coated glass against 100% for the uncoated glass.

EXAMPLE 3

To further illustrate the effect of unsaturation in the fatty acid residue, a sample of frozen hamburger was coated by dipping in the composition of Example 1. No damage to the meat occurs and the film is completely transparent. A further sample of the meat was coated by dipping in the 10% composition of Example 2. The cover film is white and appears completely opaque.

EXAMPLE 4

To illustrate the effect on the burst strength of varying the substituents of the glyceride and the chain length of the fatty acid, Example 1 is repeated using various commercially-available and experimental acylated glycerides. The glyceride:cellulose derivative ratio of 85:15 was used throughout. The effect of introducing a hydroxyl group in the fatty acid is seen by comparison, of Samples 5 and 6. The burst strength for 0.375 mm. cast films are shown in the following Table I. Therein, the R's refer to Formula I above, $R_2$ being hydrogen in each case.

Table I

| Sample No. | $R_1$ | $R_3$ | Burst Strength gms./sq. cm. |
|---|---|---|---|
| 1 | aceto | $C_{16}$ | 844 |
| 2 | do | $C_{18}$ | 1,139 |
| 3 | do | $C_{20}$ | 1,251 |
| 4 | do | $C_{22}$ | 1,280 |
| 5 | do | $C_{18}$ | 1,104 |
| 6 | do | 12-Hydroxy $C_{18}$ | 288 |
| 7 | formo | $C_{18}$ | 534 |
| 8 | lacto | $C_{18}$ | 689 |

To illustrate the effect of varying the constituents in the composition, the following Examples 5–7 are included as illustrative. In each of them, the acetoglyceride used is from a commercial sample and more than one acyl radical is present. The average chain-length of the fatty acid is about $C_{16}$ to $C_{18}$ and the hydroxyl value is negative. The acetyl number is about 256–258, indicating diacetylation. The iodine number is from about 48 to about 56.

Also in each, the test films are cast on glass plates with a laboratory casting knife applicator adjusted for a 30 mil wet thickness. The final film thickness is 12±2 mils (i.e., 0.32±0.07 mm.) and the test specimens are 2.5 inches in diameter. Burst strength (Strength) data is determined gm./sq. cm. and specific permeability (SP) data is determined as the number of milligrams of water passing through one sq. cm. of a film one mm. thick in 24 hours at 4° C. Viscosity of the cellulose derivatives is determined in seconds according to the above-noted ASTM method.

EXAMPLE 5

To show the effect of varying the viscosity of the cellulose derivative, a series of tests were run using compositions having an acetoglyceride content of 70% and a 30% content of cellulose acetate-butyrate having an acetyl:butyryl ratio of 29.5:17. Typical results are shown below in Table II.

Table II

| Viscosity | Softening Point (° C.) | Strength | SP |
|---|---|---|---|
| 2 | 94 | 518 | 1.27 |
| 15 | 97 | 511 | 1.16 |
| 25 | 92 | 443 | 1.45 |
| 40 | 81 | 422 | 1.53 |

EXAMPLE 6

To show the effect of varying the acetyl-butyryl ratio of acetate-butyrate, a series of tests is run using differing amounts of commercially-available cellulose acetate-butyrate (CAB) products having an acetyl:butyrate ratio of 20.5:26 but different viscosities. Typical results are shown below in Table III.

Table III

| CAB Viscosity | Content (Percent CAB) | Softening Point (° C.) | Strength | SP |
|---|---|---|---|---|
| 3 | 20 | 87 | (¹) | 1.56 |
| 3 | 25 | 91 | 227 | 1.62 |
| 3 | 30 | 96 | 316 | 1.29 |
| 20 | 20 | 91 | 209 | 2.29 |
| 20 | 25 | 94 | 284 | 1.56 |
| 20 | 30 | 95 | 380 | 1.38 |

¹ Too soft.

EXAMPLE 7

To show the effect of varying the acetyl-butyryl ratio of the CAB in the composition, a series of tests is run using CAB products having viscosities within the 15–25 second range. Typical results are shown below in Table IV.

Table IV

| Acetyl:Butyryl Ratio | Content (Percent CAB) | CAB Viscosity | Strength | SP | Softening Temperature |
|---|---|---|---|---|---|
| 29.5:17 | 25 | 15 | 395 | 0.85 | 93 |
| 29.5:17 | 30 | 15 | 511 | 1.16 | 97 |
| 29.5:17 | 20 | 25 | 316 | 1.11 | 82 |
| 29.5:17 | 25 | 25 | 391 | 1.36 | 88 |
| 29.5:17 | 30 | 25 | 443 | 1.45 | 92 |
| 20.5:26 | 20 | 20 | 209 | 2.29 | 91 |
| 20.5:26 | 25 | 20 | 284 | 1.56 | 94 |
| 20.5:26 | 30 | 20 | 380 | 1.38 | 95 |
| 13:37 | 20 | 20 | (1) | 1.39 | 67 |
| 13:37 | 25 | 20 | 218 | 1.66 | 73 |
| 13:37 | 30 | 20 | 333 | 1.00 | 82 |
| 13:37 | 35 | 20 | 565 | 1.37 | 84 |

[1] Too sticky.

EXAMPLE 8

To illustrate the effectiveness of the coatings of the present invention in preventing weight loss during both ordinary and refrigerated storage, frankfurters were coated by dipping. Percent loss in weight after storage, both at 3° C. and at room temperature, is shown in Table V.

Table V

| Days in Storage | Percent Weight Lost | | | |
|---|---|---|---|---|
| | 2 | 4 | 8 | 14 |
| Uncoated: | | | | |
| 3° C. | | 12 | 19 | 26.5 |
| Rm. Temp. | 22 | 30 | 43 | 45 |
| Coated: | | | | |
| 3° C. | | 0 | 0 | 0.25 |
| Rm. Temp. | 2.0 | 3.8 | 6.3 | 9.0 |

Although the coating compositions of this invention are comprised essentially of the two components, i.e., the glyceride component with the cellulose ester component dissolved therein, it is to be understood that other materials may be present. For example, antioxidants, dyes, compatible oils, other strengthening agents and the like may be present without departing from the scope of the invention. It is also to be understood, however, that they must not be of such character as to adversely affect the transparency of the coating, the coated article, or the two principal components. The latter will also be present in the indicated proportions each to the other.

The coating compositions of this invention have been noted as being excellent for preservation and/or protection of foodstuffs. However, the same physical properties which make them advantageous for that purpose also make them excellent for protecting other materials such as wood, rubber, metal and the like for long periods from adverse effects of air, moisture, dirt and the like.

Although burst strength and other critical data have been principally presented for films of about 0.32 mm. thickness, this is not intented as a limitation. Films of both lesser and greater thickness are easily formed. The optimum thickness of coating chosen in actual use may be varied at will to suit the user's requirements for a particular purpose.

I claim:
1. A transparent coating composition consisting essentially of from about 40 to about 85 parts by weight of a glyceride selected from the group consisting of (a) glycerides represented by the formula

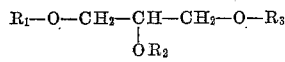

wherein $R_1$ and $R_2$ are selected from the group consisting of hydrogen and the acyl radicals of aliphatic monobasic and polybasic acids of from one to about six carbon atoms, not more than one of $R_1$ and $R_2$ being hydrogen, and $R_3$ is the acyl radical of an aliphatic, long-chain fatty acid having one unsaturated double bond and a chain length of from about ten to about 30 carbon atoms, and (b) mixtures of such glycerides in which the average unsaturated double bond content of the long-chain fatty acids is from about 0.5 to about 1.5; and from about 15 to about 60 parts by weight of a cellulose ester component having a hydroxyl content of from about 0.5% to about 2.5%, an acetyl content of from about 6% to about 32%, and from about 15% to about 50% of an aliphatic acyl radical of from three to about eighteen carbon atoms, said ester having a viscosity of from about 0.25 to about 35 seconds and being present in amount to comprise from about 15 to about 50 weight percent of the composition.

2. A transparent coating composition according to claim 1 in which the glyceride is a monoacetylated glyceride.

3. A transparent coating composition according to claim 1 in which the glyceride is a diacetylated glyceride.

4. A transparent coating composition according to claim 1 in which the cellulose ester is a cellulose acetate butyrate.

5. A composition according to claim 4 in which the cellulose ester has an acetyl content of from about 10% to about 25% and a butyryl content of from about 25% to about 45%.

6. A composition according to claim 4 in which the cellulose ester content is from about 15% to about 50% of the total weight.

7. A transparent coating composition according to claim 1 characterized in that said composition has a softening point below about 90° C.

8. A transparent coating composition according to claim 1 characterized in that a film of said composition has a bursting strength of at least 300 gm./sq. cm. at a film thickness of 0.32±0.07 mm.

9. A process of preparing a transparent coating composition which comprises dissolving in from about 40 to about 85 parts by weight of a liquified glyceride selected from the group consisting of (a) glycerides represented by the formula

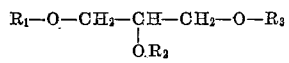

wherein $R_1$ and $R_2$ are selected from the group consisting of hydrogen and the acyl radicals of aliphatic monobasic and polybasic acids of from one to about six carbon atoms, not more than one of $R_1$ and $R_2$ being hydrogen, and $R_3$ is the acyl radical of an aliphatic, long-chain fatty acid having one unsaturated double bond and a chain length of from about ten to about 30 carbon atoms, and (b) mixtures of such glycerides in which the average unsaturated double bond content of the long-chain fatty acids is from about 0.5 to about 1.5; from about 15 to about 60 parts by weight of a cellulose ester component having by weight a hydroxyl content of from about 0.5% to about 2.5% and an acetyl content of from about 6% to about 32% and from about 15% to about 50%, of an aliphatic acyl radical of from three to about eighteen carbon atoms.

10. A transparent film consisting essentially of from about 40 to about 85 parts by weight of a glyceride selected from the group consisting of (a) glycerides represented by the formula

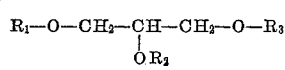

wherein $R_1$ and $R_2$ are selected from the group consisting of hydrogen and the acyl radicals of aliphatic monobasic and polybasic acids of from one to about six carbon atoms, not more than one of $R_1$ and $R_2$ being hydrogen, and $R_3$ is the acyl radical of an aliphatic, long-chain fatty acid having one unsaturated double bond and a chain length of from about ten to about 30 carbon atoms, and (b) mixtures of such glycerides in which the average unsaturated double bond content of the long-chain fatty acids is from about 0.5 to about 1.5; and from about 15 to about 60 parts by weight of a cellulose ester component having a hydroxyl content of from about 0.5% to about 2.5%, an acetyl content of from about 6% to about 32% and from about 15% to about 50%, of an aliphatic acyl radical of from three to about eighteen carbon atoms, said ester having a viscosity of from about 0.25 to about 35 seconds and being present in amount to comprise from about 15 to about 50 weight percent of the composition.

11. A film according to claim 10 characterized in that it has a specific permeability below about 2.0 and that at a thickness of about 0.32±0.07 mm. it has a burst strength of at least 300 gm./sq.cm. and in being flexible, pliable and substantially 100% transparent at refrigeration and frozen storage temperatures down to about minus 20° C.

12. A method of preparing a transparently coated article which comprises heating a composition as defined in claim 1 to a temperature at which said composition is completely liquified, covering said article with liquified composition; and cooling the so-covered article to a temperature at which the coating solidifies.

13. A coated article prepared according to claim 12.

References Cited in the file of this patent

UNITED STATES PATENTS

| | | |
|---|---|---|
| 2,015,145 | Hubbuch | Sept. 24, 1935 |
| 2,341,464 | Meyer | Feb. 8, 1944 |
| 2,840,474 | Wirt et al. | June 24, 1958 |
| 2,840,476 | Wirt et al. | June 24, 1958 |

OTHER REFERENCES

Malm et al.: Ind. Eng. Chem., vol. 39, pp. 168–174 (1947).

Feuge: Food Technology, June 1955, pages 317 and 318.

Alfin-Slater et al.: Journal of the American Oil Chemists Society, March 1958, vol. XXXV, No. 3, pages 122–127.

UNITED STATES PATENT OFFICE
CERTIFICATE OF CORRECTION

Patent No. 3,000,748                             September 19, 1961

Walter L. Clark

It is hereby certified that error appears in the above numbered patent requiring correction and that the said Letters Patent should read as corrected below.

Column 6, line 52, for "acetyl-butyryl ratio of" read -- amount of cellulose --.

Signed and sealed this 27th day of February 1962.

(SEAL)
Attest:

ERNEST W. SWIDER                                   DAVID L. LADD

Attesting Officer                                      Commissioner of Patents